Aug. 2, 1938.  C. L. BAKER  2,125,414
MACHINE FOR FORMING TUBULAR SHEET MATERIAL BODIES
Filed Aug. 24, 1937  9 Sheets-Sheet 3

Fig.3.

Inventor
CHARLES L. BAKER.
By Dowell & Dowell
Attorneys.

Aug. 2, 1938. C. L. BAKER 2,125,414
MACHINE FOR FORMING TUBULAR SHEET MATERIAL BODIES
Filed Aug. 24, 1937 9 Sheets-Sheet 4

Inventor
CHARLES L. BAKER.
By Dowell & Dowell
Attorneys.

Aug. 2, 1938.   C. L. BAKER   2,125,414
MACHINE FOR FORMING TUBULAR SHEET MATERIAL BODIES
Filed Aug. 24, 1937   9 Sheets-Sheet 6
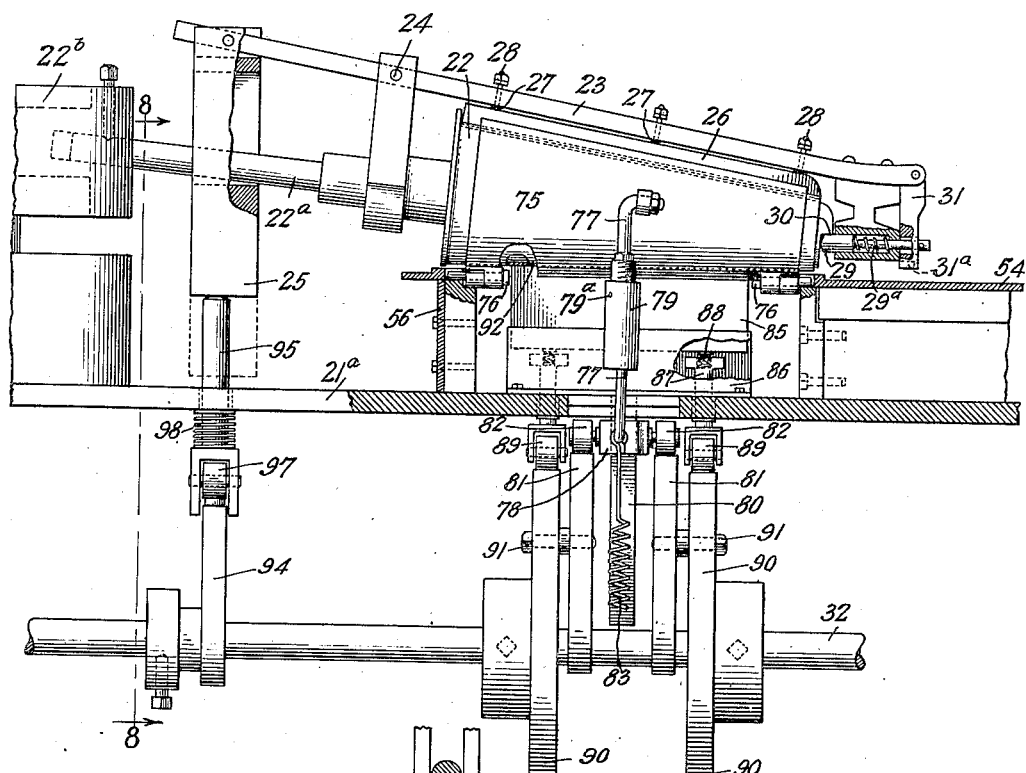
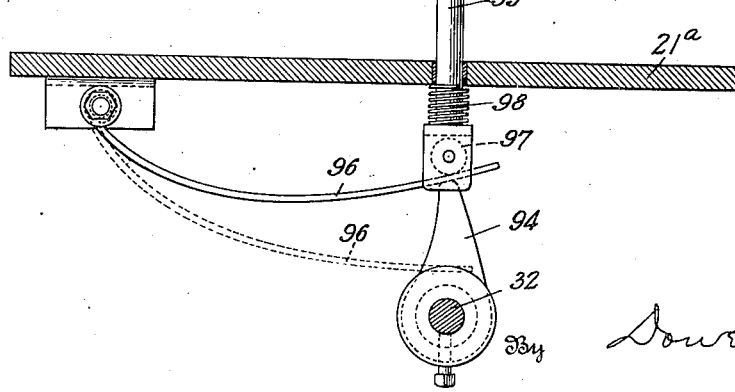
Inventor
CHARLES L. BAKER.
By Dowell & Dowell
Attorneys.

Aug. 2, 1938. C. L. BAKER 2,125,414
MACHINE FOR FORMING TUBULAR SHEET MATERIAL BODIES
Filed Aug. 24, 1937 9 Sheets-Sheet 7

Inventor
CHARLES L. BAKER.
By Dowell & Dowell
Attorneys.

Aug. 2, 1938.   C. L. BAKER   2,125,414
MACHINE FOR FORMING TUBULAR SHEET MATERIAL BODIES
Filed Aug. 24, 1937   9 Sheets-Sheet 8
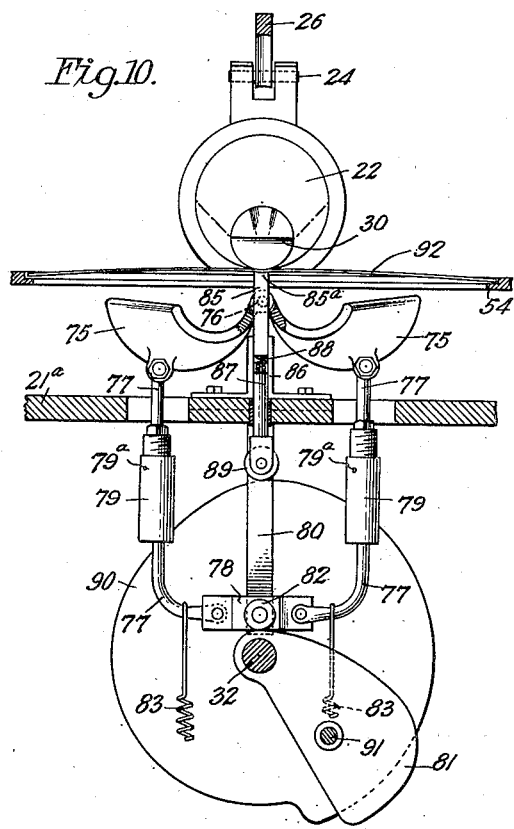
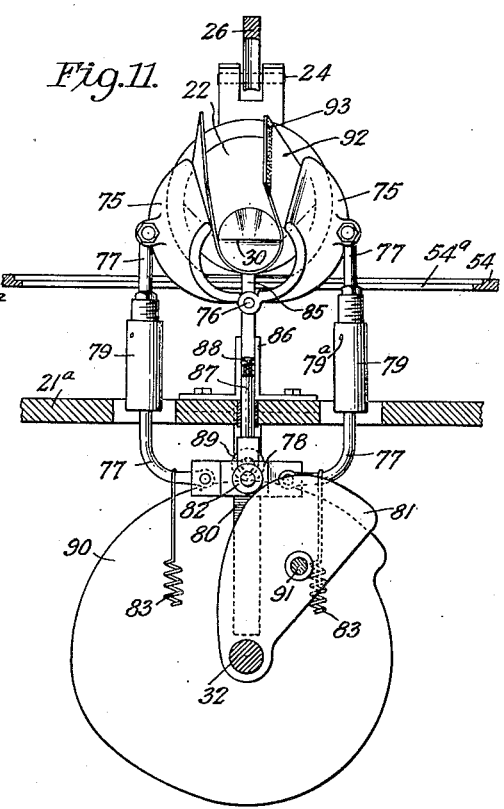
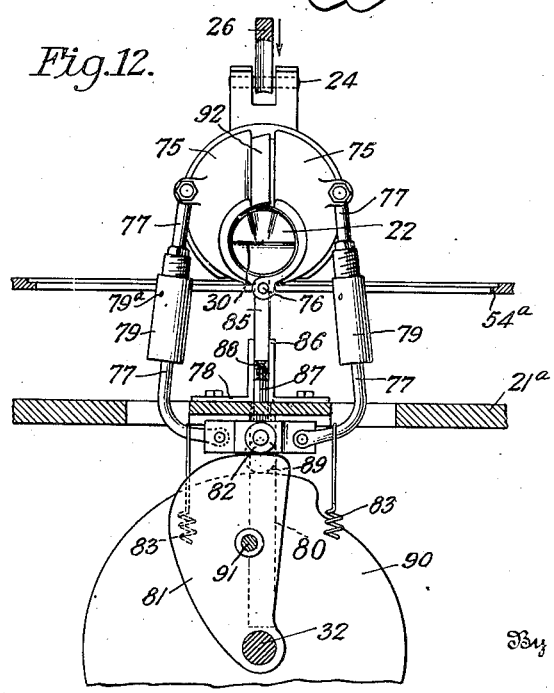
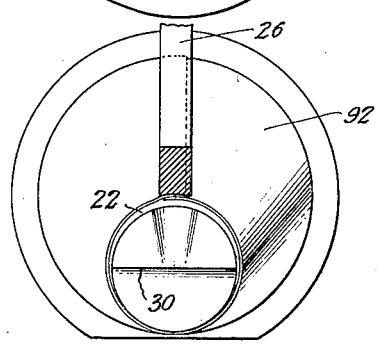
Fig.13.
Inventor
CHARLES L. BAKER.
By Dowell & Dowell
Attorneys.

Aug. 2, 1938.    C. L. BAKER    2,125,414
MACHINE FOR FORMING TUBULAR SHEET MATERIAL BODIES
Filed Aug. 24, 1937    9 Sheets-Sheet 9
Fig.17.
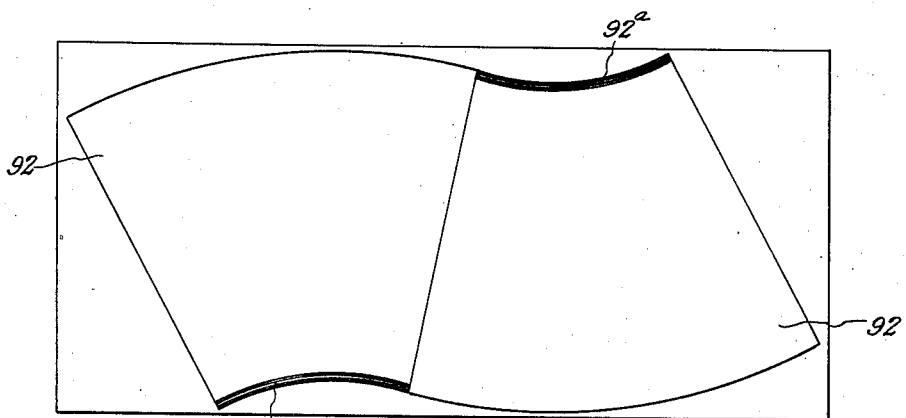
Fig.18.
Fig.19.
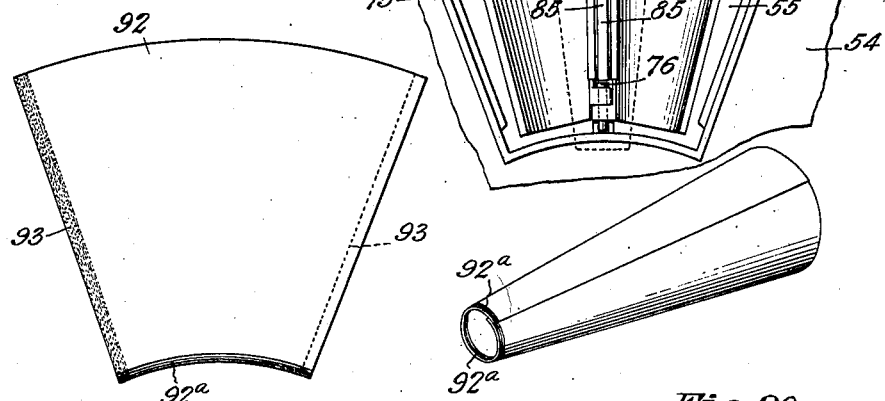
Fig.20.
Inventor
CHARLES L. BAKER.
By Dowell & Dowell
Attorneys.

Patented Aug. 2, 1938

2,125,414

UNITED STATES PATENT OFFICE 2,125,414

MACHINE FOR FORMING TUBULAR SHEET-MATERIAL BODIES

Charles L. Baker, Lancaster, Pa., assignor to Jet D. Sheetz, Lancaster, Pa.

Application August 24, 1937, Serial No. 160,703

19 Claims. (Cl. 93—44.1)

This invention relates to paper tube manufacture, with particular reference to special container article production. Specifically, it aims to provide an improved machine for forming hollow frusto-conical bodies or shells from sheet material in the production of paper milk bottles or the like.

The underlying purpose is to produce paper milk bottles of a superior manufacture, suitable for commercial use in place of the ordinary glass bottles now generally in use. To this end, the principal object of the present invention is to provide for the perfect formation of tubular shells to be made into or comprise the bottle bodies. One of the main considerations in this connection is to effect a tight and inseparable bind of the overlap fold seam or joint of the material down one side, so as to obviate any possible leaking or pulling apart. Another prime consideration is to bring the fold edges of the material evenly together with the proper exactitude or flushing of side margins to eliminate distortion and assure level ending for the application of top and bottom parts.

A further important object of the invention is to provide a fairly simple and inexpensive machine for forming these bodies in a manufacture of paper milk bottles at sufficiently low cost to be commercially practical and desirable. Such a machine, operable without the need of skilled labor and requiring very little related equipment, would render it entirely feasible for dairy establishments to purchase the same and manufacture their own containers, which is one of the purposes had in mind.

Other objects, as well as the particular advantages of the invention, will appear and the invention itself will be best understood from the following description with references to the appended drawings, illustrating one practical embodiment of its concept in what is probably the simplest possible form.

In said drawings:

Fig. 3 is a somewhat enlarged bottom plan, or view looking upwardly from the floor, showing the driving and operative parts;

Fig. 7 is a similar view taken a little farther to the left or toward the center of the machine than Fig. 6 and showing some of the parts in a different position;

Fig. 8 is a section taken on the line 8—8 of Fig. 7;

Figs. 10, 11 and 12 are views similar to Fig. 9 illustrating the parts in different stages or extents of operative movement;

Fig. 13 is a detail view of one of the forming members and cooperative parts, showing a tubular body being formed thereon;

Fig. 17 represents a cutting of the formative sheet material sections from rectangular blanks;

Fig. 18 is a detail illustration of a formative sheet section;

Fig. 19 is a somewhat enlarged fragmentary plan view of the sheet section in position for application to a forming member, with the applicative parts therebeneath; and Fig. 20 is a perspective view of the sheet section formed into a frusto-conical tubular body or shell.

Figure 1:
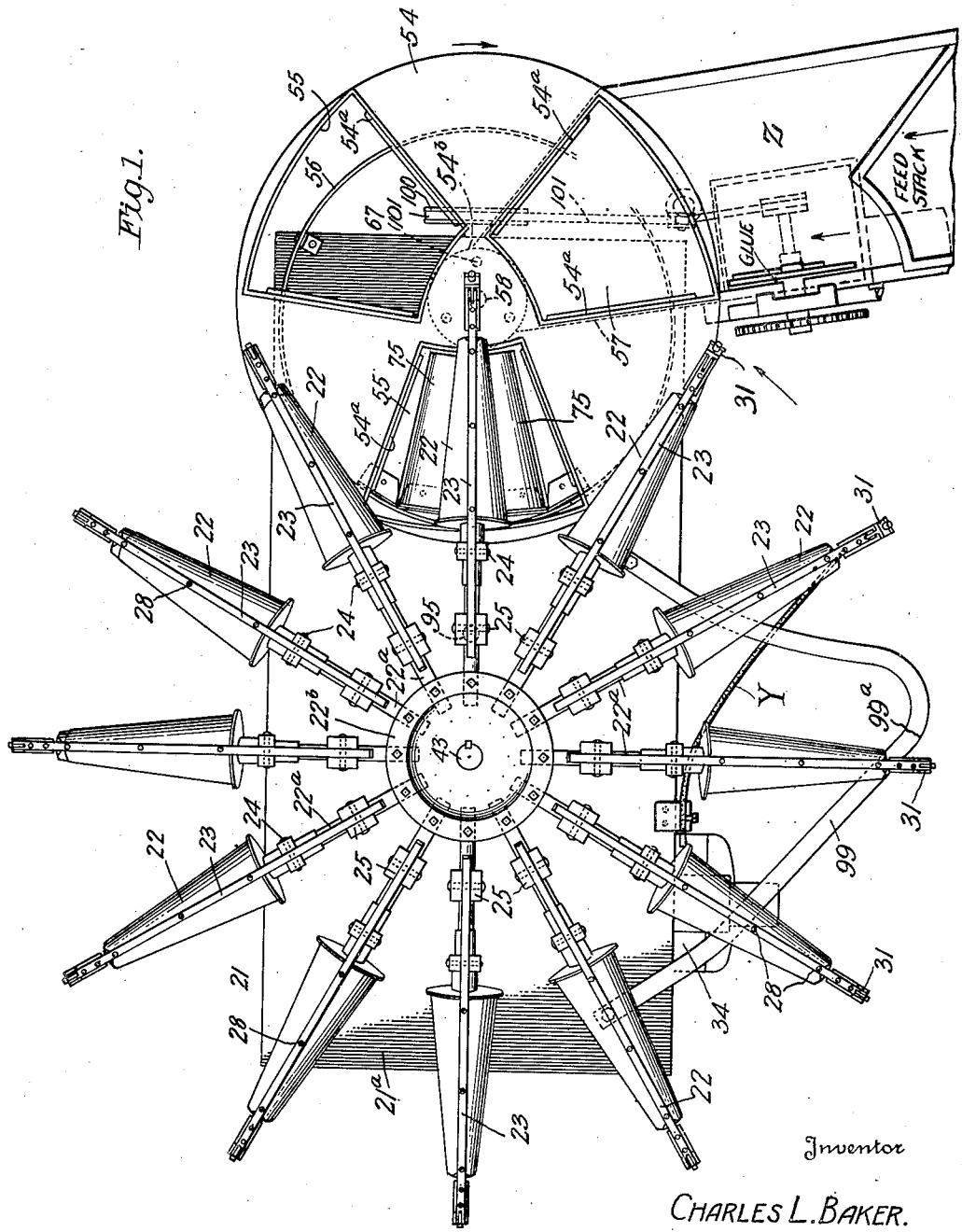
Fig. 1 is a top plan view of the machine showing the movable work parts.
Figure 2:
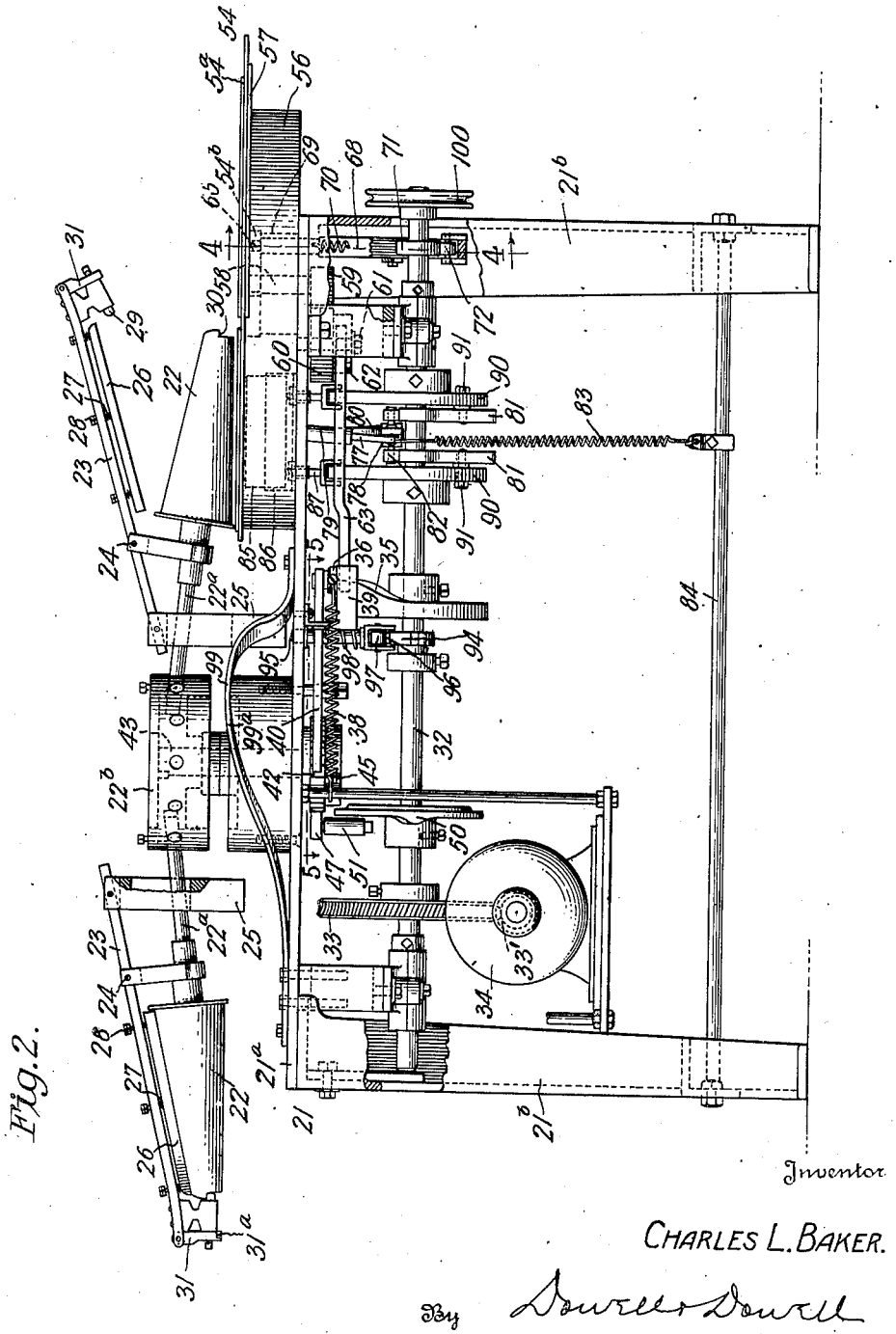
Fig. 2 is a side elevation, partly in section, as viewed from that side constituting the bottom of Fig. 1, with some of the duplicative portions of one of the upper work parts removed to better show the construction.

Referring to these drawings, and for the moment more especially to Figs. 1 and 2, a machine frame is provided by the table 21, comprising in this instance simply a top 21ª and four legs 21ᵇ. This is preferably constructed of metal and will advisedly be suitably braced for proper rigidity.

Supported on said table is a horizontally rotatable member hereinafter called the "forming wheel", comprising a series of radially disposed form elements 22 equispaced from one another circumferentially. These form elements are of conical, or frusto-conical, shape in this instance in order to form frusto-conical tubes or shells, and are individually stationary or non-rotatable.

They are carried upon radial arms or bars 22a extending from a hub portion 22b. Each of said form elements 22 has an associated clamp member comprising a lever 23 fulcrumed upon a swing pivot 24 with its longer arm overextending the form element lengthwise or longitudinally thereof, and its shorter arm therebehind carrying a weight 25. This fulcrumed lever, along said longer arm thereof, carries a presser bar 26, tensioned yieldably therefrom, in parallel relation, by springs 27 on guide bolts 28. This construction is shown on a larger scale in Fig. 7. Said presser bar extends substantially the full length of the form element and its lower or clamp face is slightly arcuated (see Figs. 9 and 13) in conformity with the form element surface upon which it is adapted to bear or press.

Figure 6:
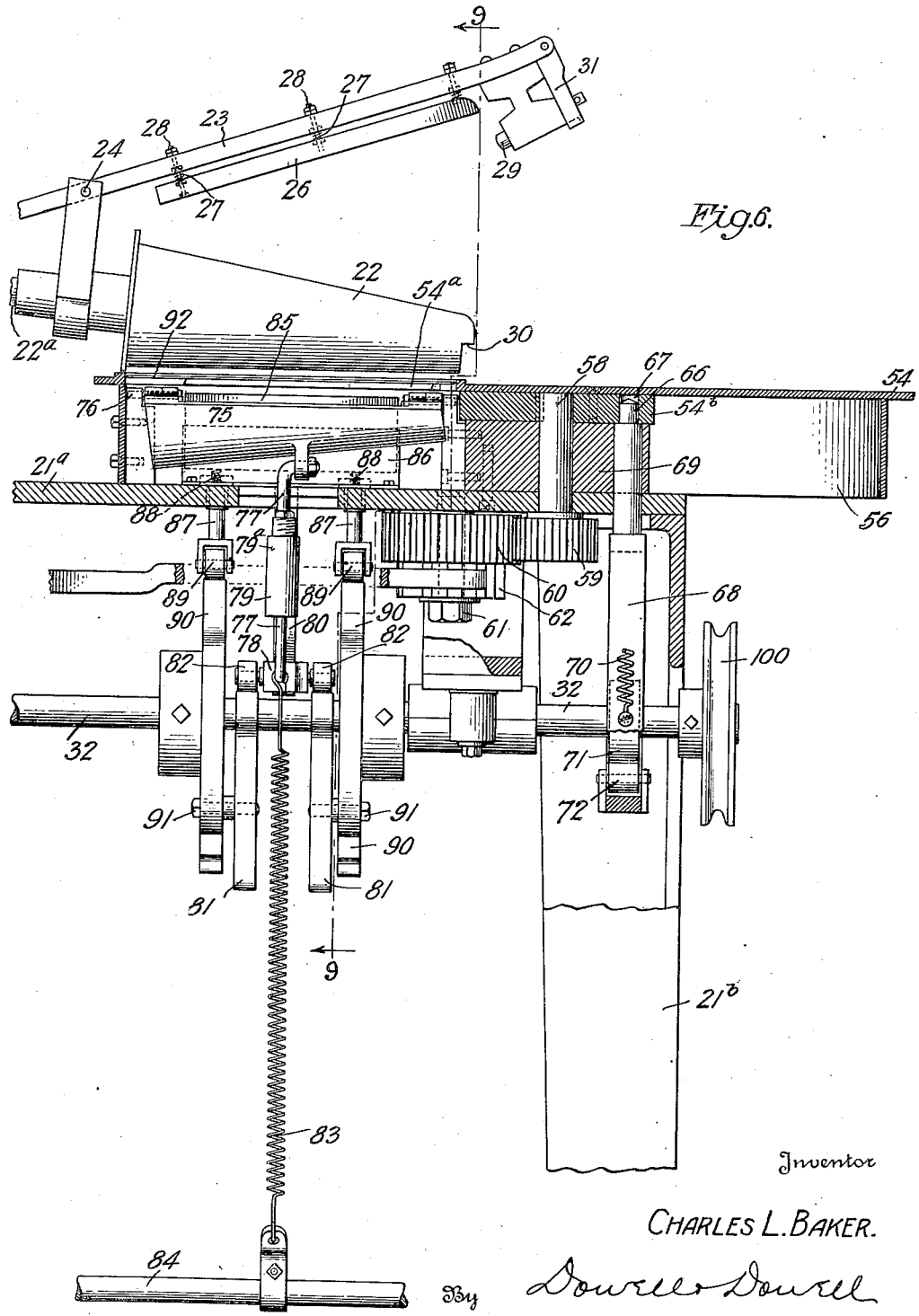
Fig. 6 is an enlarged partly sectional and partly fragmentary view of that part of the machine which constitutes the right end of Fig. 2, also in elevation.

It will be observed that the fulcruming of the lever 23 is such as to bring this presser bar to bear lengthwise squarely upon the form element when it is swung downwardly. In other words, its swing pivot 24 is located above as well as behind the back or inward end of the form element. The swing movement is against the action of the weight 25 which is itself pivoted to the shorter arm of the lever and tends normally to hold the same in the upwardly swung position shown at the right end of Fig. 2 and in Fig. 6. The forward end of said fulcrumed lever carries a trigger or snap-catch (see Fig. 7), comprising a plunger 29 engaging under a notch or shoulder 30 formed on the outer or free end of the form element 22. Said plunger is carried in a bracket on the end of the fulcrumed lever and works by tension action of a spring 29a to "snap" engage under the aforementioned notch when the lever is swung downward. It is released by a swing arm 31 pivoted to the extremity of said fulcrumed lever, and through which the shank of the plunger extends with a back cotter-key or cross-pin fastening.

The said forming wheel is rotated intermittently an extent equal to the arc distance between its radial members, so as to bring the described form elements 22 successively into a predetermined position of momentary arrest. This is achieved through a driven shaft 32 supported in the table, under the top, by suitable bearings (shown, not referenced) and receiving its drive by worm gearing 33—33' in this instance from a motor 34, the last-named being advantageously underslung in the table as shown. Said shaft carries a cam 35 working against a swing bar 36 (see Fig. 3) through a roller (unreferenced) thereon to swing the same backward, or to the right as viewed in Fig. 3. This bar is pivoted by bolt 37 to the underside of the table top and its free end has a connected spring 38 for drawing and holding it normally forward, while the said free end rests upon a supporting track 39. Pivoted to said bar is a pawl arm 40 (see Fig. 3) held, as by spring 41, in ratcheting engagement with a ratchet gear 42, so as to rotate the latter partially, or the extent of one tooth in this instance, upon each backward swing of the bar. Said ratchet gear is fixed, below the table top, on the axial shaft 43 of the forming wheel, to which said wheel itself is fixed or keyed as shown, above the table top. Its ratio to the wheel is such that when it is rotated the prescribed extent, as described, the wheel will be advance rotated a single step, or the distance of one space between its radial form members. The direction of rotation by which this occurs is indicated by the arrow in Fig. 3. By this arrangement accordingly, the forming wheel is alternatively advanced and stopped, step-by-step, as the shaft 32 is continuously rotated.

Figure 5:
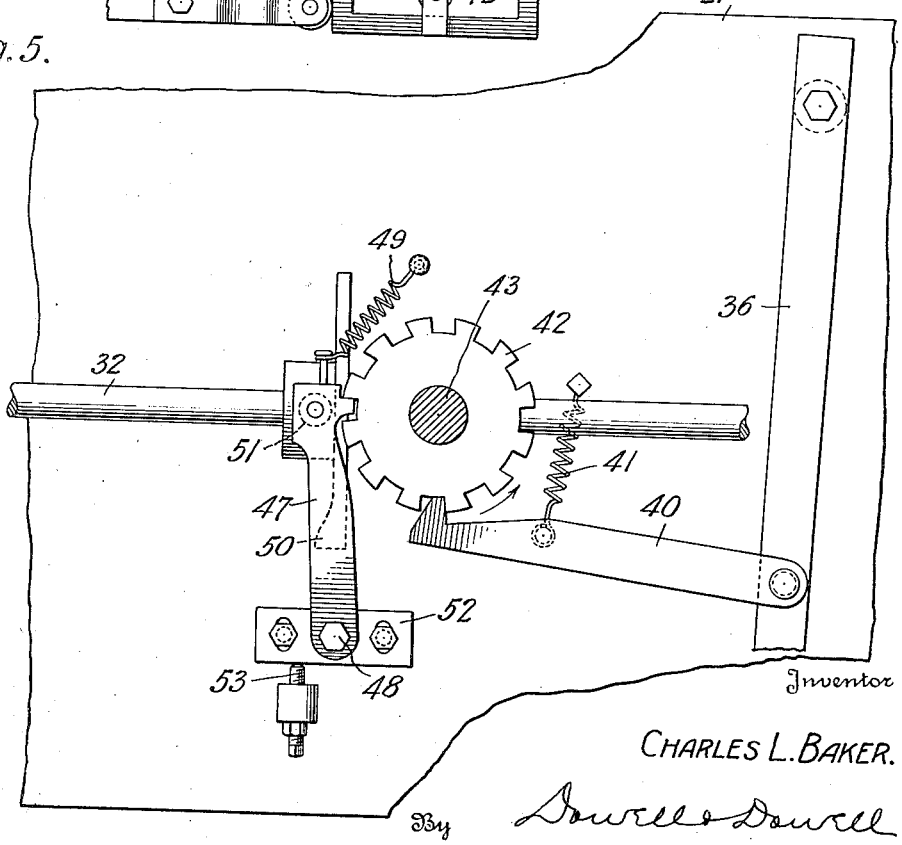
Fig. 5 is an enlarged and fragmentary plan, or view looking downwardly, on the section 5—5 of Fig. 2, showing a part of the operative mechanism in opposite view to that illustrated in Fig. 3.

To prevent an over-advance, or rotation beyond a single work step, a double check is provided. First, a brake friction is applied to the ratchet gear by a band 44 encircling a collar portion thereof, so that said gear will be rotated by pull of the pawl arm 40 with a certain drag eliminating possible overrun. The tightness of this band is adjustable advantageously by a holding bolt clamp 45 engaged therearound and fastened to the underside of the table by a bolt 46. Secondly, the ratchet gear is engaged by a guard pawl 47 pivoted by bolt 48 to the underside of the table and ratcheting over the gear under tension action of a spring 49 (see Fig. 5). This last-named pawl is moved out of engagement with the gear by a cam 50, fixed on the rotating shaft 32, acting against a roller 51 carried by the free end of the pawl. Said cam acts to disengage the pawl from the gear an instant before the operating action of the pawl arm 40 thereon and to allow reengagement with a successive notch of the gear after the same has been rotated the prescribed extent by the aforementioned pawl arm. An adjustment of the pawl, to eliminate play, may be provided by attaching its pivot 48 to a slide plate 52 held by a set screw 53 under the table (see Fig. 5), so as to move and hold the pawl forwardly to bear closely against the notches of the ratchet gear.

Also supported on the aforesaid table is another horizontally rotatable member hereinafter called the "feeding wheel", comprising a circular plate 54 having a radial series of openings 55, in this instance of frusto-sectoral shape and only three in number, formed therein equidistantly apart. Along the lateral edges of said openings, narrow ledge or shelf portions 54a are provided for the support of sheet material fitted thereinto. This feeding wheel or plate rests upon a circular band or track 56 somewhat above the table top level, and at one point in its plane of movement passes over a sectoral platform 57 supported by said band or track, which is itself shown fastened to the table.

Said feeding wheel is rotated intermittently, in synchronism with the aforedescribed forming wheel, an extent equal to the arc distance between its radial openings, or at a ratio of 4 to 1 in this instance, so as to bring said openings successively under successive form elements of said forming wheel, or into position with one opening 55 of the latter directly underlying a form element 22 of the former, in a momentary arrest of movement coincident with that of the forming wheel. In this arrested movement positioning, with respect to the forming wheel, and as represented in Fig. 1, the openings are also successively brought into position with a following another opening 55 thereof precedently or preliminarily overlying said platform 57, which is pre-located properly for that purpose, and the relative rotation of the two wheels is indicated by the associated arrows in said Fig. 1.

This intermittent or step-by-step movement is accomplished through mechanism also actuated by continuous rotation of the driven shaft 32. The axial shaft 58, on and with which the feeding wheel is turned, carries a pinion 59 below the table top (see Figs. 3 and 6). Engaged with this pinion is a driving pinion or gear 60, in this instance having a 2 to 1 ratio thereto, rotating on a pin or shaft 61. This last-named pinion has an associated ratchet 62 affixed thereto or turning therewith, having in this instance half as many notches as there are form elements on the forming wheel, or six in the present embodiment. Engaging with this ratchet is a pawl lever 63, held ratchetably thereto as by a spring 64 and advantageously free-end supported as by a truss-bar or hanger 65, pivotally connected to the aforementioned swing bar 36, in this instance close to the free end thereof, so as to rotate said ratchet by push thereon the extent of one notch upon each backward swing of said bar. This rotation of the ratchet partially rotates the co-turning pinion 60, so as in turn to rotate the smaller pinion 59, and thereby rotate or advance the feeding wheel the extent of one spacing between its radial openings with every advance of the forming wheel the extent of a spacing between its form elements, or in a relation of $1/3$ to $1/2$ in the present instance.

Figure 4:
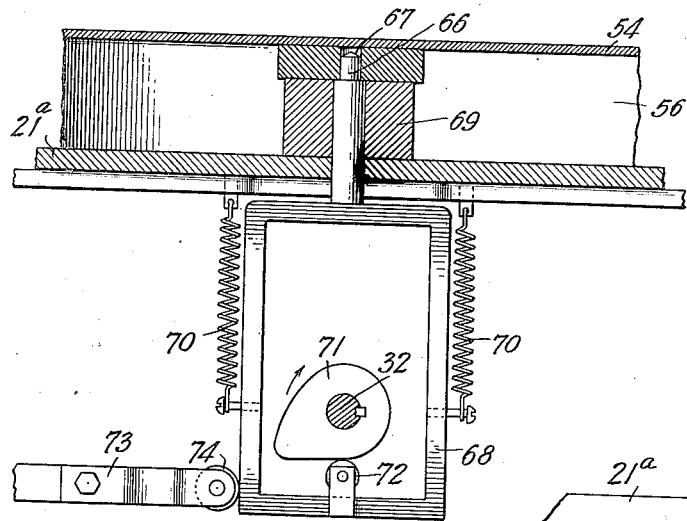
Fig. 4 is a somewhat enlarged sectional and fragmentary view taken on the line 4—4 of Fig. 2.

To prevent an overthrow, or rotation beyond the intended extent, a check-guard device is provided. This consists of a plunger-pin 66 engageable in a series of holes 67, corresponding to the number of described openings, formed in the hub portion 54$^b$ of or secured to the feeding wheel at points to accurately determine the positioning thereof upon each arrested movement. This plunger-pin is carried by a yoke member 68 (see Fig. 4) below the table top and moves vertically through a bushing or spacer block 69, between the wheel and table top, by which it forms a sliding guide for said yoke member. Said yoke member is supported by springs 70 on opposite sides thereof, by which it is tensioned upwardly so as to engage the plunger-pin with a "snap" action into any one of the aforenamed holes brought into register therewith by turn of the wheel, the said pin of course being normaly pressed in ride-over contact against the under face of the hub portion between intervals of hole register. On the other hand, said yoke member with its pin is retracted to release the wheel at the proper moment for advance rotation by a cam 71 keyed upon the driven shaft 32, said cam working in this instance against a wear roller 72 on the yoke member. The side thrust of this cam action is advantageously countered by a thrust-bar 73 carrying a roller 74 bearing against the side of the yoke member and supported by bolting to the frame of the table (see Fig. 3).

Figure 9:
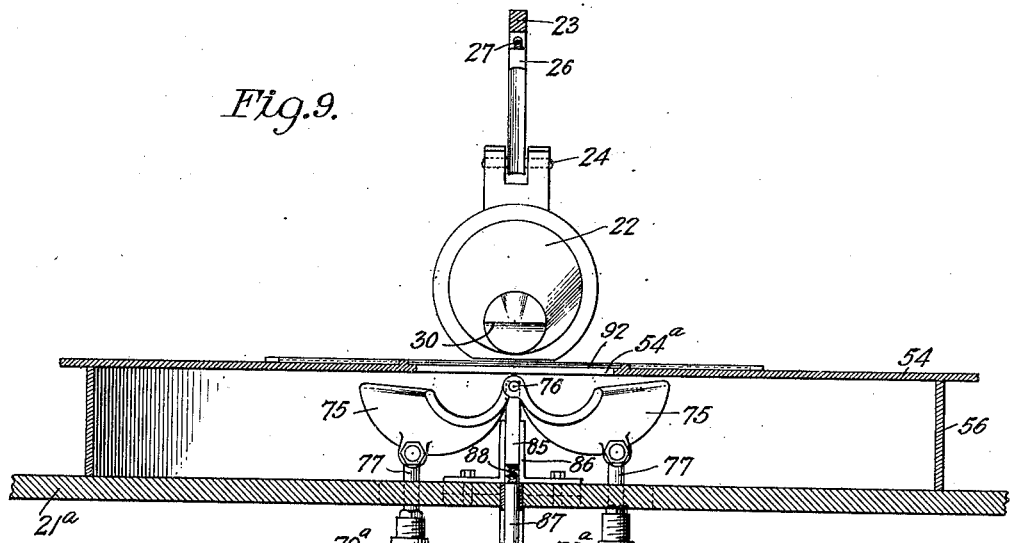
Fig. 9 is a section taken on the line 9—9 of Fig. 6.
Figure 14:
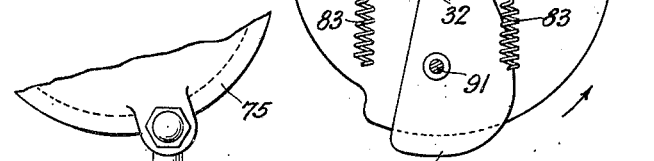
Fig. 14 is an enlarged detail and partly sectional view of one of the parts of Fig. 9.
Figure 16:
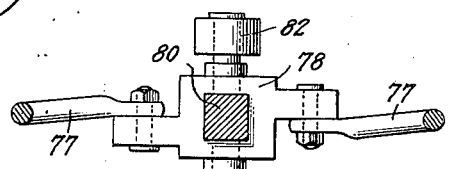
Fig. 16 is an enlarged detail illustration taken on the line 16—16 of Fig. 9.

Under the feeding wheel, at the locus where its openings and the form elements of the forming wheel come together in arrested position, are a pair of folding members 75. These members are hinged together, as by bolting 76, within the vertical plane of said opening and form element registry (see Figs. 9 and 19) and are arcuated so as to engage substantially over any one of the form elements arrested thereover, upon upward movement on their hinge. They are operated together by yoke arms 77 pivotally attached thereto, as shown (see Fig. 9), and extending upwardly from a block 78 to which they are likewise pivoted, as shown, at their lower ends. These arms are length-adjustable as by intermediate screw-and-sleeve piecing connection 79 (see Fig. 14), of a turnbuckle nature, and it will be observed that the arm at the right, as viewed in Fig. 9, is adjusted slightly longer than the other so as to move the folding member at that side upwardly over the form element slightly in advance of the corresponding member at the left. The adjustment of said arms is desirably secured as by a set screw 79$^a$ so that it cannot vary from vibration of the machine operation. The aforesaid block 78 is slidably engaged (see Fig. 16) upon a guide post 80, depending from the table top, so as to move said yoke arms up and down in actuation of the folding members with a positively maintained equilibrium in a perfectly straight path. Upward movement is imparted thereto in this instance by a pair of cams 81, fastened correspondingly upon the driven shaft 32, the said cams working against rollers 82 laterally carried by the block at opposite sides, while downward movement to normal position at the end of the cam action is imparted by a pair of springs 83 attached between the block, or the yoke arms thereof, and a rod or rods 84 at the bottom of the table.

Figure 15:
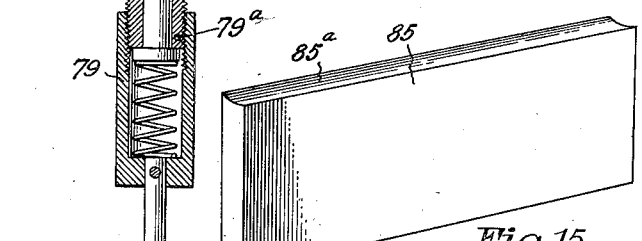
Fig. 15 is an enlarged perspective view of a detail part showing only partially in Figs. 6 and 7 and by dotted lines only in Fig. 2.

Between the described folding members is a clamp plate 85 represented in detail in Fig. 15. This plate works upwardly from the table top within a guide 86 and advantageously extends through an elongate opening formed in the hinge connection of said plates, serving in this instance to lock the hinge bolts in place (see Figs. 9 and 19). Its upper edge or face 85$^a$ is arcuated to fit closely to the surface of the form elements 22 against which it is operatively pressed. Said plate rests upon push-pins 87, with compressor springs 88 therebetween, and said pins carry rollers 89 on their lower ends bearing upon a pair of operating cams 90 secured to the driven shaft 32. These last-named cams are adapted through said pins to raise and hold the plate pressed under tension of the compressor springs against a form element during a substantial part of the shaft revolution, or for substantially the entire period of forming and feeding wheel arrestment. Shown applied to said driven shaft at opposite sides of the aforedescribed cams 81 in this instance, these operating cams 90 are desirably secured, as by bolts 91, to said aforedescribed cams 81 for purposes of unity and perfect coordination of the four cam elements.

In operation, formative sections 92 of sheet material—which will ordinarily be paper or cardboard—fitting into the openings 55 of the feeding wheel, are fed into said openings, one to each, as the openings are successively brought to arrest over the platform portion 57, the said openings, as before indicated, being formed to receive such sections of a shape to be formed on the form elements 22. These formative sections hereinafter referred to as "the paper sheets" may advantageously be cut, two or more at a time, from rectangular blanks of sheet material as represented in Fig. 17. This of course is done by cutter dies forming no part of the machine proper. Simultaneously, the cuts or paper sheets may be printed with any indicia, such as the name and trademark of the dairyman, which may be desired, and will advantageously be impressed with ribbing or grooving 92$^a$ along the top arcuated edge, for a purpose that will be explained later. Along the bottom of one side or folding edge, and/or along the top of the other side or folding edge, a strip of gluing 93 is applied. See Fig. 18, wherein a complete formative section or paper sheet is shown with the aforesaid ribbing and glue stripping. The glue applied is preferably a special dry glue, adhering only when opposed glued strips are brought together, and consisting of a compound of pulverized rubber and gasoline, but it may be any ordinary dry glue later moistened, or a wet glue freshly applied, before the paper sheet is placed in the opening of the feeding wheel.

The paper sheet is placed in an opening 55 so that the applied glue strip, or strips, will be brought opposite the desired portion thereof in the folding process, or in this instance with the side or folding edge having the glue strip along its bottom disposed in advance of the other, with reference to the feeding wheel rotation, so as to bring said side or edge to the right of the form element as viewed from the right end of Fig. 1. The opening is then advanced, by the described operative mechanism, to the successive arrest position under a form element 22, with the paper sheet lying under said form element and over the aforedescribed folding plates (see Fig. 9).

Thereupon instantly, the clamp plate 85 is moved upwardly by its operating cams to press and hold the sheet tight against the form element (see Fig. 10). Immediately thereafter, the folding plates 75 begin their upward folding movement under action of their operating cams on the block 78, so as to engage and fold or wrap the sheet around said form element with an exact evening or flushing of their top and bottom edges. Three stages of this folding plate movement are illustrated in Figs. 10, 11 and 12. In Fig. 10, the aforementioned clamp plate has been moved to clamp the paper sheet against the form element and the folding plates are on the point of beginning upward movement. In Fig. 11, the folding plates have been actuated substantially three-fourths of the way upward in their folding engagement of the sheet around the form element, with the plate and consequently the folding edge with upturned glue strip at the right side slightly in advance of that at the left, the clamp plate being meanwhile retained in clamping position. In Fig. 12, the folding plates have been moved the full way substantially encompassing the form element and folding the paper sheet tightly over the form element with the right glue-stripped edge underlying the other and with their arcuated top and bottom edges absolutely flush and even, the clamp plate being still in clamping position. In this last-described view, both the folding plates and the clamp plate are on the point of release from the cam action thereon. However, it will be observed that the clamp plate is retained in its position until after the full release of the folding plates.

At this point, the swing lever 23 associated with the form element is swung downward to bring the top clamping presser bar 26 into press upon the fold or folded edges of the paper sheet, its application and position being longitudinally along the fold between the folding plates (see Fig. 12). This action of the swing lever is produced by a cam 94 on the driven shaft 32 (see Fig. 7), acting through a push-rod 95 to lift the weight 25 on the short arm of said lever and thereby swing the lever down with a swift motion at the proper moment. Said cam works against a shock-guard or rider tongue 96 swinging up and down therewith from an end pivoting under the table (see Fig. 8), and said push-rod carries a wear roller 97 on its lower end riding on said tongue. A spring 98 applied to the rod, in this instance between its lower end and the under side of the table top, serves to return it quickly to normal position upon release from the cam action. The aforesaid swing lever thereby swung to downward position, as shown in Fig. 7, instantly engages its aforesaid trigger latch 29 with a "snap" action under the notch 30 of the form element, so as to lock and hold the presser bar 26 in place tightly pressed over the fold or folded edges of the paper sheet.

Thereupon the folding plates 75, the lower clamp 85 and the weight 25 are released by termination of their respective cam actions, the said folding plates and the said lower clamp plate being instantly returned to initial position, the first by spring action and the second by gravity, after the top clamping presser bar 26 has been secured to place as just described. The feeding and forming wheels are then released for the next rotational advance by the described driving mechanism. This cycle of operation is repeated successively, step-by-step, with each advance of the feeding and forming wheels, with a paper sheet applied to each of the form elements as they are brought into position one after the other over the folding plates. It continues automatically as long as the shaft 32 is driven and paper sheets are fed into the openings of the feeding wheel.

The paper sheet applied to, or formed on, the form element of the forming wheel as described, is carried around by the wheel for substantially a full rotation of the same, the upper clamping press member being held in place securely all the way around as successive form elements are brought to arrested position over the folding plates and feeding wheel opening. During this carriage around on the form element to which it is applied, it is held continuously under the pressure of said press clamp 26 applied to its fold or folded edges. This pressure, under maintained action of said clamp, is exceedingly strong and continuous along its length. It presses the glue-stripped fold or folded edges so firmly and tightly together, that by the time the formed tube or paper body has been carried around substantially a full revolution of the wheel, the joint has been fully set and dried in an exceedingly tight bind that cannot separate and will not leave any points of possible leakage. A particularly strong and durable bottle body is thus produced, in which the joint itself becomes a strengthening and rigidifying rib.

The tubular body or shell is released from the form element 22, upon which it is formed, just before the forming wheel completes a full revolution thereafter. This is advantageously effected by a trip cam 99 extending outwardly from the table at one side (see Figs. 1 and 2), against which the latches or trigger-catches of the form elements are brought to releasing engagement as the wheel is rotated, so as to permit withdrawal of the formed article and restore the form element to readiness for a subsequent formation before it is brought again into cooperation with the feeding wheel. In this instance, the lower end of the trip-catch swing-arm 31 is formed with a notch 31ª (see Figs. 2 and 7) which strikes against the edge of said trip cam 99, at approximately the point 99ª (see Fig. 1), as the form element passes such point. This swings said arm 31 outwardly so as to draw the plunger 29 out of engagement with the notch 30 and allow the swing arm 23 to swing upwardly again under action of its weight 25. The two opposite positions, i. e. the clamped and the up-swung positions, of said swing arm 23 are illustrated in Fig. 2, and the operation of the described trip will be readily understood from the foregoing.

Ordinarily it will be desirable to employ means for withdrawing the tubular articles from the form elements at the point of or as they are released from the clamping press action of the said upper clamps. Means for doing this is indicated by the member X in Fig. 1, but has not been shown in full detail because it forms no actual part of the machine or invention proper, being purely an incidental and collateral expedient. However, such means as indicated may constitute a simple frictioning device such as a rubber-coated rod or the like so placed with respect to the moving form elements as to contact and draw the tubular articles off from the same by merely slipping them outward. It might alternatively comprise a flexible member having a rubber, felt or other contacting surface, or it might be an engaging finger, a rotating member or any other means tending to draw the articles by friction longitudinally off of the form elements as they move in relation thereto, very little force being required for the purpose.

Also, in connection with the machine, an automatic gluing or an automatic feeding device, or both—which may of course be combined into one—may advantageously be used to feed the glue-stripped paper sheets into the feed openings of the feeding wheel. Such a device is represented by the unit Z in Fig. 1, but this likewise has not been shown in full detail inasmuch as it forms no actual part of the machine or invention proper and is merely collateral thereto. Such a gluing or feeding device, or both, singly or combined as in the present illustration, may desirably be driven from the driven shaft 32, so as to be cooperated or timed in relation thereto. For this purpose a pulley 100, having a driving belt 101 trained thereover, and extending to another pulley of said unit Z, is shown on the end of said shaft. Of course some other, or an independent driving means might equally well be utilized for the purpose.

By the last-mentioned expedients, the machine may be rendered automatic in operation all the way through, from the point of feeding to the point of discharging the formed articles from its radial form members. This will be desirable in ordinary usage and operation, because it will dispense with hand feed and hand discharge. The described machine, however, deals only with the actual formation of the tubular bodies or shells, in the production of paper milk bottles of a superior construction to be used in lieu of the ordinary glass bottles now generally in use.

Referring back to the statement with reference to the formation of ribbing or grooving 92ª on the arcuated top edge of the paper sheets fed to the feeding wheel, it is here explained that the purpose of said ribbing or grooving is to provide a more effective glue holding area for the application of paper necks or top pieces intended to be applied to the tubular bodies or shells formed on the machine, as described in fuller detail in a separate application of this inventor copending herewith. The ribbing or grooving provides recesses in which glue will be pocketed to hold the applied necks or top pieces more securely and the latter themselves may desirably have similar ribbing or grooving on their inner surfaces by which to aid the union. The means for applying these necks or top pieces to the hollow frusto-conical bodies formed on the present machine is treated and covered fully in the aforementioned separate application, Ser. No. 160,704 filed at the same time as the present one, and forming a division and companion case of the same. The complete container article or body intended principally to be produced is shown in copending application Ser. No. 160,706, also filed herewith by the same applicant.

It will be understood that the machine can be built in varied design for different production purposes and that various changes may be made in the construction and arrangement of the operative parts, with different combinations and sub-combinations, and with different equivalent usages thereof, without departing from the spirit and scope of this invention. For such reason, the appended claims are not intended to limit the same to the specific construction and arrangement or to the specific organization shown.

Having thus described my invention, what I claim as new and desire to secure by Letters Patent of the United States is:

1. In a machine for forming tubular bodies from sheet material, including means bringing a plurality of form elements successively into a predetermined position of arrest, means feeding to said elements successively in the arrested position sheet material in a form to be formed by folding thereon, and means folding the sheet material onto the form elements while they are held in arrested position: means applying pressure to the fold of the material after the folding onto said elements and maintaining said pressure upon the fold for a substantial predetermined period after said elements have moved beyond the arrested position, the last-named means engaging lockably with the form elements in and during the entire period of applying the pressure to said fold.

2. In a machine for forming tubular bodies from sheet material, including means bringing a series of form elements successively into a predetermined position of arrest, means feeding sections of the sheet material to said elements in the arrested position in a form to be formed by folding thereon, and means folding said sheet material sections onto the form elements while they are held in the arrested position, the combination of means carried upon and lockably engaging with said form elements applying pressure to the fold of the material upon completion of the folding thereonto and maintaining said pressure upon the fold for a predetermined period after said form elements have moved away from the arrested position.

3. In a machine for forming tubular bodies from sheet material, including means bringing a series of form elements successively into a predetermined position of arrest, means feeding sections of the sheet material into applicative relation to said elements successively in the arrested position, and means for applying said sections in formative fold upon said elements, the combination of means carried upon and engaging latchably with said form elements applying pressure to the fold of the sections upon their formative application thereto and maintaining said pressure on the fold for a predetermined substantial period after said elements have been moved beyond the arrested position so as to bind the fold securely under an adhesive applied to the same, the last-named means comprising separately actuated members releasing at the end of said predetermined period.

4. In a machine for forming tubular bodies from sheet material, including means bringing a plurality of form elements successively into a predetermined position of arrest, means feeding to said elements in the arrested position sections of the sheet material in a form to be formed by folding application thereon, means clamping the sheet material sections to the form elements in the arrested position during the folding application thereto, and means folding said sections onto the form elements while held in the arrested position: means lockably engaging with said form elements with an application of pressure to the fold of the material upon completion of the folding thereonto and maintaining said pressure upon the fold for a predetermined substantial period after the form elements have been moved away from the arrested position, and associated means disengaging the last-named means from the form elements at the end of said pressure applying period.

5. In a machine for forming tubular bodies from sheet material, including means bringing a series of form elements successively into a predetermined position of arrest so as to receive the material to be formed thereon, means feeding sections of the sheet material to be formed into applicative relation to said elements in the said arrested position, means for applying said sections in formative fold upon said elements, and means clamping the sections to the form elements during the applicative fold thereonto, the combination of means associated with said form elements and operatively movable into locking engagement with the same so as to apply pressure to the fold of the sections upon their formative application thereto and to maintain said pressure thereon for a predetermined substantial period after said elements have been moved beyond the arrested position, and means disengaging the last-named means again from said elements at the end of said predetermined period.

6. In a machine for forming tubular bodies from sheet material, including means bringing a series of form elements successively into a predetermined position of arrest to receive the material to be formed thereon, means successively feeding formative sections of the sheet material in applicative relation to said elements as they are successively brought to the arrest position, means clamping the sheet sections in their applicative relation to the form sections during the application thereto in the arrested position of the latter, and means applying said sections to said elements by folding action thereonto while said elements are held in the arrested position: means carried individually upon and movable into latching engagement with said form elements applying pressure to the fold of the sections upon the same at the end of the folding application thereto and maintaining said pressure for a predetermined period after said application and movement of the elements beyond the arrested position, together with means releasing the last-named means from engagement with said elements at the end of said predetermined period.

7. In a machine for forming tubular bodies from sheet material, including means bringing a plurality of form elements successively into a predetermined position of arrest, means feeding to said elements successively in the arrested position sheet material in a form to be formed by folding thereon, and means folding the sheet material onto the form elements while they are held in arrested position: means applying pressure to the fold of the material after the folding onto said elements and maintaining said pressure upon the fold for a substantial predetermined period after said elements have moved beyond the arrested position, the last-named means comprising pivoted pressure arm members carried along with said form elements and swung downward thereonto in locking engagement therewith over said fold.

8. In a machine for forming tubular bodies from sheet material, including means bringing a plurality of form elements successively into a predetermined position of arrest, means feeding to said elements successively in the arrested position sheet material in a form to be formed by folding thereon, and means folding the sheet material onto the form elements while they are held in arrested position: means movable into locking engagement with said form elements so as to apply pressure to the fold of the material after the folding action thereonto and to maintain said pressure upon the fold for a substantial predetermined period after said elements have moved beyond the arrested position, the last-named means comprising press bar elements mounted in conjunction with said form elements and pivoted so as to be swung downwardly thereonto into said locking engagement with the same.

9. In a machine for forming tubular bodies from sheet material, including means bringing a plurality of form elements successively into a predetermined position of arrest, means feeding to said elements successively in the arrested position sheet material in a form to be formed by folding thereon, and means folding the sheet material onto the form elements while they are held in arrested position: means applying pressure to the fold of the material after the folding onto said elements and maintaining said pressure upon the fold for a substantial predetermined period after said elements have moved beyond the arrested position comprising press bar members mounted in carry relation to and moved into locking engagement with said form elements, and means for disengaging said press bar members from said form elements at the end of the predetermined pressure applying period.

10. In a machine for forming tubular bodies from sheet material, including means bringing a plurality of form elements successively into a predetermined position of arrest, means feeding to said elements successively in the arrested position sheet material in a form to be formed by folding thereon, and means folding the sheet material onto the form elements while they are held in arrested position: means movable into locking engagement with said form elements so as to apply pressure to the fold of the material after the folding action thereonto and to maintain said pressure upon the fold for a substantial predetermined period after said elements have moved beyond the arrested position, the last-named means comprising press bar elements mounted in conjunction with said form elements and pivoted so as to be swung downwardly thereonto into said locking engagement with the same, together with trip means releasing said press bar elements from the locking engagement with said form elements at the end of the predetermined pressure period.

11. In a machine for forming tubular bodies from sheet material, including means bringing a series of form elements successively into a predetermined position of arrest, means feeding formative sections of the sheet material successively into position for application to said form elements in the said arrested position, means clamping the sheet sections to said elements during the application thereto, and means applying said sections to said elements by a folding action thereonto with one portion overlying another while said elements are held in the arrested position:

means carried upon and moved into locking engagement with said form elements so as to apply a tensioned pressure thereagainst upon the fold or overlap portion of the sections at the end of the folding application thereonto and to maintain said pressure for a predetermined period after said application and movement of the elements beyond the arrested position so as to press the fold tightly together, and separate means releasing the last-named means from engagement with the form elements at the end of said period after said elements have moved a predetermined distance beyond the arrested position.

12. In a machine for forming tubular bodies from sheet material, including an endless means bringing a series of form elements successively into a predetermined position of arrest, means successively feeding formative sections of the sheet material to position for application to said elements as the latter are successively brought to the arrested position, means clamping the sheet sections to said form elements during the formative application thereto, and means applying said sections to said elements by folding thereonto with adhesive coated portions overlapped in a fold joint while said elements are held in the arrested position, the combination of means carried with and moving into latch engagement with said form elements so as to apply a tensioned pressure thereagainst upon the fold joint of the sections at the end of the folding application thereonto and maintaining said pressure thereon for a predetermined substantial period after the elements have moved beyond the arrested position so as to bind the fold joint under the action of the adhesive applied to the same, and means tripping the last-named means out of engagement with the form elements at the end of said period after said elements have moved a predetermined distance beyond the arrested position.

13. In a machine for forming tubular bodies from sheet material, including a rotating endless member conveying a series of form elements successively into a predetermined position of arrest, a cooperative endless member successively feeding sections of the sheet material in applicative relation to the form elements in the said arrested position, a clamping member actuated to clamp the sections to the form elements during their application to the latter, and cooperating folding members engaging the sections with an overfold around the form elements while held thus clamped: means movably associated with each of the form elements and brought into pressure application in lock engagement therewith individually upon the fold of the sections at the end of the folding operation thereonto and maintaining said pressure for a predetermined substantial period after the sections are subsequently moved from the arrested position and independent means disengaging said last-named means from the form elements at the end of said period consecutively as they are conveyed to a predetermined point beyond the arrested position.

14. In a machine for forming tubular bodies from sheet material, including means bringing a plurality of form elements successively into a predetermined position of arrest, means feeding to said elements successively in the arrested position sections of sheet material in a form to be formed by folding thereon, means clamping the sheet material sections to the form elements upon their arrest in applicative relation thereto while in the arrested position, means folding the sheet material sections onto the form elements while they are held in the arrested position, and means including a common drive shaft operating said form element moving means, said material section feeding means, said clamping means and said folding means in synchronized relation to each other: means associated and movable into locking engagement with said form elements so as to apply pressure to the fold of the material sections upon their folding thereonto and to maintain said pressure upon said fold for a substantial predetermined period after said elements have moved beyond the arrested position and means disengaging said pressure applying means from said elements at the end of said predetermined period, said pressure applying means being moved into engagement with said form elements by means including the same drive shaft operating the several aforementioned component means of the machine.

15. In a machine for forming tubular bodies from sheet material, including means bringing a series of form elements successively into a predetermined position of arrest, means successively feeding formative sections of the sheet material to a position in the arrest position of said form elements to be formationally applied folding thereonto, means clamping the sheet sections in applicative relation individually to the respective form sections during the formational application thereto, and means applying said sections by folding upon the form elements while the latter are held in the arrested position, together with means actuating said form element moving means, said section feeding means, said clamping means and said folding application means in cooperative relation to each other: means carried upon and movable into locking engagement with said form elements so as to apply a tensioned pressure thereagainst upon the fold of the sections after their folding application thereto and maintaining said pressure for a predetermined substantial period after said elements have moved beyond the arrested position, and means releasing the last-named means from engagement with the form elements at the end of said period and upon their movement a predetermined extent beyond the arrested position.

16. In a machine for forming tubular bodies from sheet material, including endless means bringing a series of form elements successively into a predetermined position of arrest, means successively feeding formative sections of the sheet material to position for application to said elements as the latter are successively brought to the arrested position, means clamping the sheet sections to said form elements during the formative application thereto, and means applying said sections to said elements by folding thereonto with adhesive coated portions overlapped in a fold joint while said elements are held in the arrested position, together with means including a common drive shaft actuating said endless form element moving means, said section feeding means, said clamping means and said folding application means in cooperative synchronism with each other, the combination of means carried with and moving into lock engagement with said form elements so as to apply a tensioned pressure thereagainst upon the fold joint of the sections at the end of the folding application thereonto and maintaining said pressure thereon for a predetermined substantial period after the elements have moved beyond the arrested position so as to bind the fold joint under the action of the adhesive applied to the same, means including the aforesaid common drive shaft for moving the last-named means into locking engagement with the form elements at the proper moment in relation to the other operative means of the machine, and means tripping the said last-named means out of engagement with the form elements at the end of said period after said elements have moved a predetermined distance beyond the arrested position.

17. In a machine for forming tubular bodies from sheet material, including an endless member moving a series of form elements successively into a predetermined position of arrest, a cooperative endless member successively feeding pre-formed sections of the sheet material in applicative relation to the form elements in said arrested position, a clamp member actuated to clamp the sections to the form elements successively during their application to the latter, and folding members engaging the individual sections with an overfold around the successive form elements while held thus clamped: means associated and movable into lock engagement with each of the form elements so as to apply a pressure thereagainst upon the fold of the sections thereon at the end of the folding application thereto and maintaining said pressure upon said fold for a predetermined substantial period after the sections have been subsequently moved past the arrested position and means disengaging said last-named means at the end of said period after the sections have moved the intended distance beyond the arrested position, together with means actuating said pressure applying means into lock engagement with the form elements through mechanism of the same drive shaft employed to operate the aforesaid form element member, feeding member, clamping member and folding member.

18. In a machine for forming tubular bodies from sheet material, including an endless member carrying a series of form elements successively into a position of arrest, a cooperative another endless member successively feeding pre-formed sections of the sheet material to a position for application to said form elements in the arrested position, a clamp member actuated to clamp the sections to the form elements successively during their application thereto in the arrested position of said elements, and folding members actuated to engage the sections around the form elements with an overlap fold opposite the clamping thereto, together with mechanism including a single common drive shaft operating the several said members in synchronized relation to each other and said two endless or the form element and feeding members being simultaneously operated through a same single cam on said shaft: means associated with each of the form elements and actuated into latching engagement therewith applying a tensioned pressure to said fold at the end of the folding application thereto and maintaining said pressure upon the fold for a predetermined considerable period after said element has been carried past said arrested position, and means separately tripping said last-named means out of engagement with the form elements at the end of said period when said elements reach a predetermined point beyond the arrested position so as to permit the folded sections to be withdrawn, the said pressure applying means being actuated into engagement with their respective form elements in proper synchrony with the other operating parts of the machine through the same operating shaft.

19. In a machine for forming tubular bodies from sheet material, including an endless carriage member having a series of cylindrical form elements moved thereby successively into a predetermined position of arrest, a cooperating another endless member having a related series of pocket openings feeding sections of the sheet material in applicative relation to said form elements successively in the arrested position of the same, a clamp member actuated to clamp said sections successively to the respective form elements for and during their formative application thereto folding members actuated to fold the sheet sections around the form elements with portions thereof overlapping in a fold joint while thus clamped in the arrested position of said elements, mechanism operating said carriage member to bring the form elements successively into the arrested position, mechanism cooperatively operating the feeding member to feed the sheet sections successively thereto, mechanism actuating the clamp plate with each successive arrest of a form element in the arrested position, and mechanism actuating the folding members likewise upon each arrest of a form element in the arrested position, the combination of press bars associated with and actuated into lock engagement with the respective form elements so as to press with tensioned force upon the fold joint of the sections at the end of the folding action onto said elements and maintain said pressure thereon for a predetermined substantial period after the elements have moved beyond the arrested position, mechanism actuating the respective press bars into the lock engagement with the form elements at the conclusion of the action of the folding members, and means disengaging said press bars from the form elements at the end of said period as they reach a predetermined point beyond the arrested position.

CHARLES L. BAKER.